United States Patent

Saito et al.

[11] Patent Number: 5,742,854
[45] Date of Patent: *Apr. 21, 1998

[54] PHOTOGRAPHIC CAMERA

[75] Inventors: Takahiko Saito, Kanagawa; Akira Nakanishi, Tokyo; Shunzi Obayashi, Tokyo; Hideki Toshikage, Saitama, all of Japan

[73] Assignee: Sony Corporation, Tokyo, Japan

[*] Notice: The term of this patent shall not extend beyond the expiration date of Pat. No. 5,583,591.

[21] Appl. No.: 429,225

[22] Filed: Apr. 25, 1995

Related U.S. Application Data

[63] Continuation-in-part of Ser. No. 329,546, Oct. 26, 1994, Pat. No. 5,583,591, which is a continuation-in-part of Ser. No. 26,415, Mar. 4, 1993, abandoned.

[30] Foreign Application Priority Data

Mar. 17, 1992 [JP] Japan .................... 4-060684
Mar. 23, 1992 [JP] Japan .................... 4-065304

[51] Int. Cl.⁶ .................... G03B 17/02
[52] U.S. Cl. .................... 396/311; 396/436
[58] Field of Search .................... 396/435, 436, 396/311

[56] References Cited

U.S. PATENT DOCUMENTS 4,650,304 3/1987 Harvey .................... 396/207
5,583,591 12/1996 Saito et al. .................... 396/435

FOREIGN PATENT DOCUMENTS

0212443 3/1987 European Pat. Off. .

*Primary Examiner*—David M. Gray
*Attorney, Agent, or Firm*—Jay H. Maioli

[57] ABSTRACT

A photographic camera successively exposes a photographic film in different frame sizes, so that the processed photographic film exposed with those different frame sizes can be automatically printed. The camera varies the length and width of an exposure opening in the camera body in the film-feed direction and film width direction. The photographic camera magnetically or optically records an exposure opening signal indicative of the size of the exposure opening on the photographic film.

19 Claims, 10 Drawing Sheets

PHOTOGRAPHIC CAMERA

This is a continuation in part of application Ser. No. 08/329,546 filed Oct. 26, 1994, now U.S. Pat. No. 5,583,591, which is a continuation in part of application Ser. No. 08/026,415 filed Mar. 4, 1993, now abandoned.

BACKGROUND OF THE INVENTION

1. Field of the Invention

The present invention relates to a photographic camera for producing pictures having various frame sizes, and more particularly to a photographic camera having a recording unit for recording a signal that indicates different exposure sizes.

2. Description of the Background

The photographic film that is in the most widespread use today is 35-mm film (system 135) as provided for by Japanese Industrial Standards (JIS) and International Organization of Standardization (IOS).

U.S. Pat. No. 5,049,908 describes a photographic camera and a film therefor, with the film being of a 35-mm size devoid of sprocket holes of the size used in present 35mm-films and having an effective image area of about 30 mm across the film, thereby providing an increased effective usable film area.

More specifically, ignoring dimensional tolerances, present 35-mm films for use in general photography have a width of 35 mm between opposite longitudinal edges and include a series of film-transport perforations or sprocket holes defined along the opposite longitudinal edges of the film. The film-transport perforations are spaced 25 mm across the film and have a pitch of 4.75 mm. Frames on such a present 35-mm film are of a rectangular shape having a width of 25 mm across the film and a length of 36 mm along the film. The frames have a pitch of 38 mm, which is eight times larger than the pitch of the film-transport perforations.

As described in U.S. Pat. No. 5,049,908, some modern photographic film cameras are electronically controlled to provide motor-driven operation with high accuracy, and it has been experimentally confirmed that the film can be transported quite accurately without requiring the large sprocket wheels and film perforations that are found in most present cameras and films. In the system described in U.S. Pat. No. 5,049,908, the film-transport perforations are not present in the 35-mm photographic film, thereby increasing the available frame width across the film up to the regions where such film-transport perforations were located. The proposed film thus has an increased effective image area for improved image quality. This patent describes four sizes that are available for frames that can be exposed on a 35-mm film free of film-transport perforations.

According to one size, a frame that can be exposed in an effective image area of the 35-mm film has a width of 30 mm across the film and a length of 40 mm along the film. The frames of such a size have a pitch of 42.0 mm, for example. The frame size and pitch are selected to match specifications of the present television broadcasting system, for example, the NTSC system. Therefore, the frames have an aspect ratio of 3:4.

Another frame size described in that patent is based on High-Definition Television (HDTV) specifications, in which frames have a width of 30 mm and a length of 53.3 mm and a pitch of 57.75 mm, for example. The aspect ratio of the frames having that size is 9:16.

The above-mentioned frame sizes are full-frame sizes, and the other two frame sizes are half-frame sizes. According to one of the half-frame sizes, frames have a width of 30 mm and a length of 22.5 mm and a pitch of 26.2 mm, for example, to match present television broadcasting system specifications. According to the other half-frame size, frames have a width of 30 mm and a length of 16.9 mm and a pitch of 21.0 mm, for example, to match HDTV specifications.

Film with the above four frame formats is stored in the same film cartridge as presently available 35-mm film.

Because the frames in either of the above frame formats have a width of 30 mm, there are unexposed areas of about 2.5 mm between the frames and along the opposite longitudinal edges of the film. These unexposed areas may be used to keep the film flat, control the film, and write and read data when taking pictures.

The proposed camera may be relatively small and lightweight, because it does not require film-transport sprocket wheels.

Films that are actually collected in processing laboratories are processed either simultaneously in a batch or individually. In a simultaneous batch process, several thousand films are processed per hour at a high rate to realize economics of scale for reducing the printing cost. Specifically, a plurality of exposed films are collected in the processing laboratory and are spliced end to end to form a long, continuous film strip, which is then stored in a film magazine and subsequently processed.

If the films that are spliced into the continuous strip contain frames exposed in different frame formats, such as disclosed in U.S. Pat. No. 5,049,908, then the long single film stored in the film magazine contains different frame sizes, thereby making printing a problem.

U.S. Pat. Nos. 4,384,774 and 5,066,971 propose cameras capable of switching between half and full frame sizes at the time the film is exposed. When film exposed using these proposed cameras is spliced into a long, single, film strip for simultaneous batch processing, the continuous film strip also contains different frame sizes.

OBJECTS AND SUMMARY OF THE INVENTION

Accordingly, it is an object of the present invention to provide a variable frame size photographic system that can eliminate the above-noted drawbacks inherent in prior proposed systems.

It is another object of the present invention to provide a photographic camera that can expose a photographic film in different frame sizes as desired.

According to one aspect of the present invention, there is provided a photographic camera having a camera body with a first housing disposed in the camera body for housing unexposed photographic film in a photographic film cartridge and a second housing disposed in the camera body for housing the photographic film drawn from the photographic film cartridge. A film drive system is disposed in said camera body for driving the photographic film between the first and second housings, and a system is provided for varying the length and width of an exposure opening in the camera body in a film-feed direction and a film width direction, whereby a size of an effective area of the photographic film drawn from the photographic film cartridge available to an image of a subject to be recorded on the photographic film is changed. An exposure area control system is disposed in said camera body for changeably controlling system for varying the exposure opening dimensions, and a recording system is also disposed in the camera body for recording at least a signal that indicates the size of the effective exposure area on the photographic film controlled by the varying system.

According to another aspect of the present invention, there is also provided a photographic camera including a first housing for housing a photographic film cartridge containing a photographic film, a second housing for housing the photographic film drawn from the cartridge, a film feed system for feeding the photographic film between the first and second housings, and a film feed control system for controlling feeding of the photographic film based upon detection of at least one hole formed in the photographic film. The length and width of an exposure area on the photographic film fed by the film feed system that is available to record an image of a subject is changeably controlled and a recording system is provided for recording a signal on the marginal area of the photographic film that indicates a size relating to the effective exposure area where the photographic film is to be exposed, in which the said signal is positioned away from one of the holes.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF PREFERRED EMBODIMENTS

Figure 1:
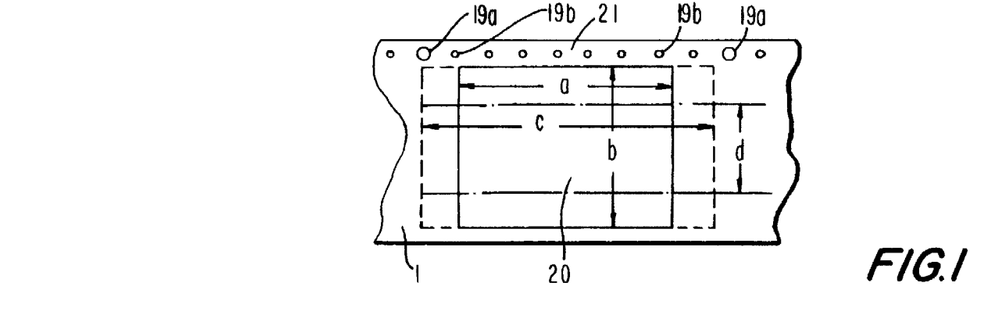
FIG. 1 is a fragmentary front elevational view of a film on which three different frame sizes are indicated on an effective exposure area of the film according to an embodiment of the present invention.
Figure 2:
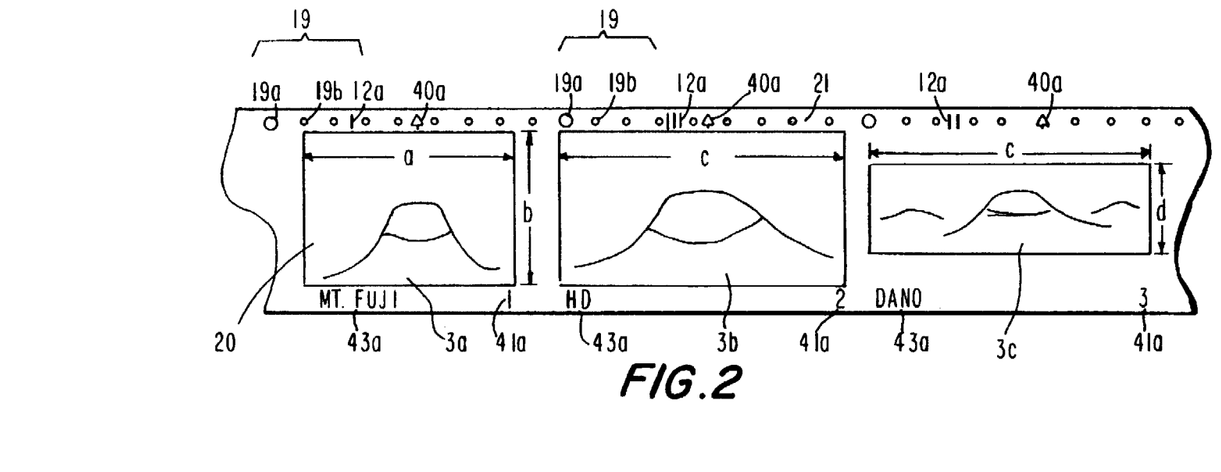
FIG. 2 is a fragmentary front elevational view of a film that has been exposed using an embodiment of the photographic camera of the present invention.
Figure 3A:
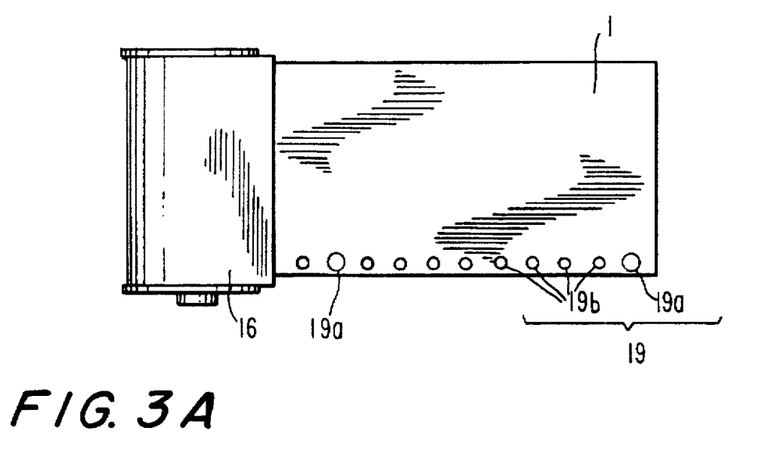
FIGS. 3A and 3B are elevational views of film cartridges that can be used in one embodiment of the photographic camera of the present invention.
Figure 3B:
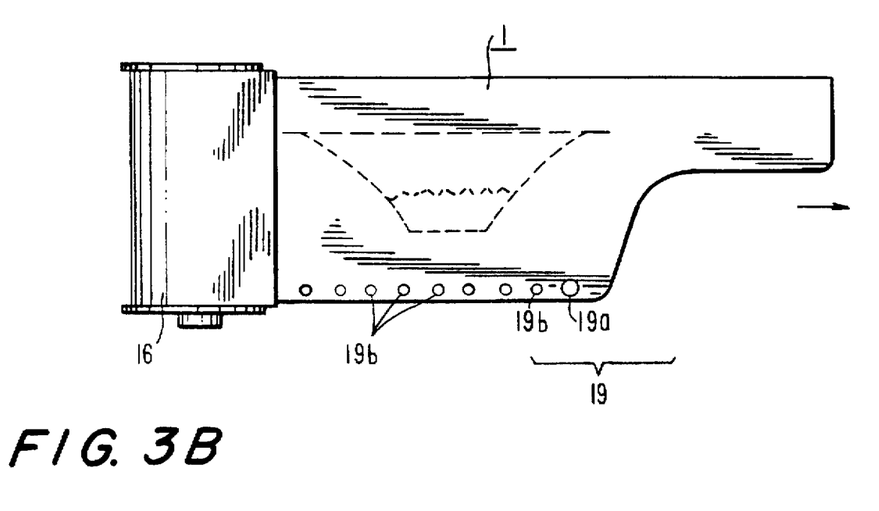

A 35-mm photographic film 1, for example, that can be used in a 35-mm photographic camera is described with reference to FIGS. 1, 2, 3A, and 3B, in which FIGS. 1 and 2 show 35-mm photographic film 1, for example, after it has been exposed, and FIGS. 3A and 3B show 35-mm photographic film 1 before being exposed.

As shown in FIGS. 3A and 3B, the 35-mm photographic film 1 is stored in a film cartridge 16 and has an end extending out of the film cartridge 16. Images that are photographed on the 35-mm photographic film 1 are turned upside down by the lenses, so that the upper end of an image is positioned on a lower portion of the photographic film 1. FIG. 3B shows by way of example a photographed image of a subject in broken lines, which appears to be turned upside down on the photographic film 1.

Each of the photographic films 1 shown in FIGS. 1, 2, 3A, and 3B has a series of film position detecting holes 19 defined along an unexposed marginal edge area thereof, which has a width of about 2.5 mm. This unexposed marginal area is used to control the film, to read data, and to write data when taking a picture. The film position detecting holes 19 have two different kinds of characteristics with respect to a predetermined exposure area of the film 1. More specifically, in the embodiment shown in FIGS. 1, 2, 3A, and 3B there are nine holes that define the predetermined exposure area, and each first hole 19a has a different size, with a larger diameter, for example, or a different shape with respect to the other eight holes 19b. Furthermore, the first hole 19a could have a triangular shape, or a shape, or some other non-circular shape. The film position detecting holes 19 are spaced at a predetermined constant pitch. The pitch of the film position detecting holes 19 in the photographic film 1 shown in FIGS. 1 and 2 is 6.28 mm.

The film position detecting holes 19 can be replaced by magnetic marks 19' spaced at a predetermined constant pitch and made by a suitable magnetic head on a magnetic edge portion 19" formed on the unexposed film. The magnetic marks 19' are shown as broken lines on the magnetic strip 19" in FIGS. 4A and 4B, because they are not actually visable. Alternatively, the marks 19' could be formed as small dots of magnetic material, such as iron oxide, deposited on the unexposed film and detected by the magnetic head.

In this case, each first mark 19a' comprises two small marks that have different characteristics with respect to the other marks 19b'. According to the present invention, the different sizes of photographs can be taken on the same photographic film so that, as shown in FIGS. 1 and 2, NTSC-matched frame size 3a having dimensions b×a (30 mm×40 mm), HDTV and wide-screen-matched frame size 3b having dimensions d×c (30 mm×53.3 mm) and panoramic frame size 3c (16.7 mm×53.3 mm) can be obtained. This can be called multi-format, with aspect ratios 3:4, 9:16, and 1:3.2, respectively.

The photographic film 1 shown in FIG. 3A has film position detecting holes 19 positioned along an area that will be an upper marginal edge area after the photographic film is exposed, however, no tongue is provided at the leading end, so that no tongue-removing process will subsequently be required. Because no tongue-removing process will be required, the subsequent processing of the photographic film 1 is less costly. This applies to the film shown in FIG. 4A as well.

The photographic film 1 shown in FIG. 3B also has film position detecting holes 19 made up of holes 19a and 19b positioned along an area that will be an upper marginal edge area thereof after the photographic film is exposed, and has a tongue at its leading end on its lower portion. The tongue at the leading end of the photographic film 1 is vertically opposite in position to the tongue of an ordinary 35-mm photographic film that is now generally commercially available. If a photocoupler is used in a photographic camera for detecting the film position detecting holes 19, then when the photographic film 1 is loaded into the photographic camera, the marginal edge with the film position detecting holes 19 is not required to be manually inserted into the photocoupler, but is automatically inserted into the photocoupler when the photographic film 1 is wound by a film transport mechanism in the photographic camera. This also applies to the film shown in FIG. 4B.

Figure 5:
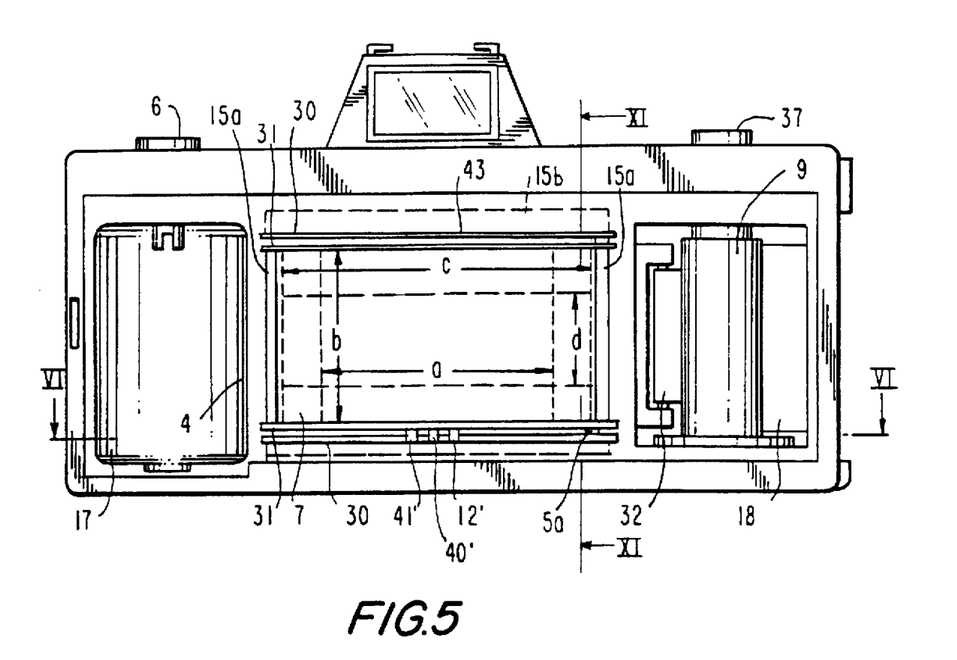
FIG. 5 is a rear elevational view of the photographic camera of one embodiment of the present invention with a rear lid removed.
Figure 6:
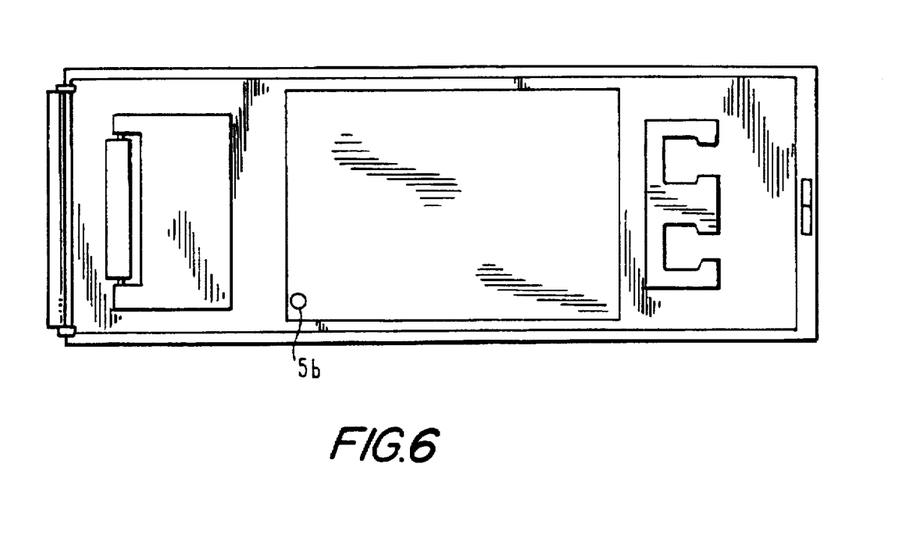
FIG. 6 is an elevational view of an inner surface of a rear lid of the photographic camera of FIG. 5.

An embodiment of a photographic camera that can use the photographic films 1 shown in FIGS. 1, 2, 3A, and 3B is shown and described with reference to FIGS. 5 through 8 and 10. FIG. 5 is a rear elevation of the photographic camera with the rear lid or cover removed. The lid is shown in FIG. 6. The photographic camera has a dark box 4 including a cartridge housing 17 for housing the film cartridge 16, which is of a known structure, an exposure opening 7 near the cartridge housing 17 and through which the photographic film 1 can be exposed to light passing through a camera lens, aperture, and shutter not shown in FIG. 5, and a film housing 18 for housing the photographic film after it has been exposed.

The photographic film that is unwound from the film cartridge 16 housed in the cartridge housing 17 is fed over the exposure opening 7 while being transversely limited in motion by upper and lower respective pairs of film guides 30, 31 and is then moved into the film housing 18 after being exposed.

Figure 8:
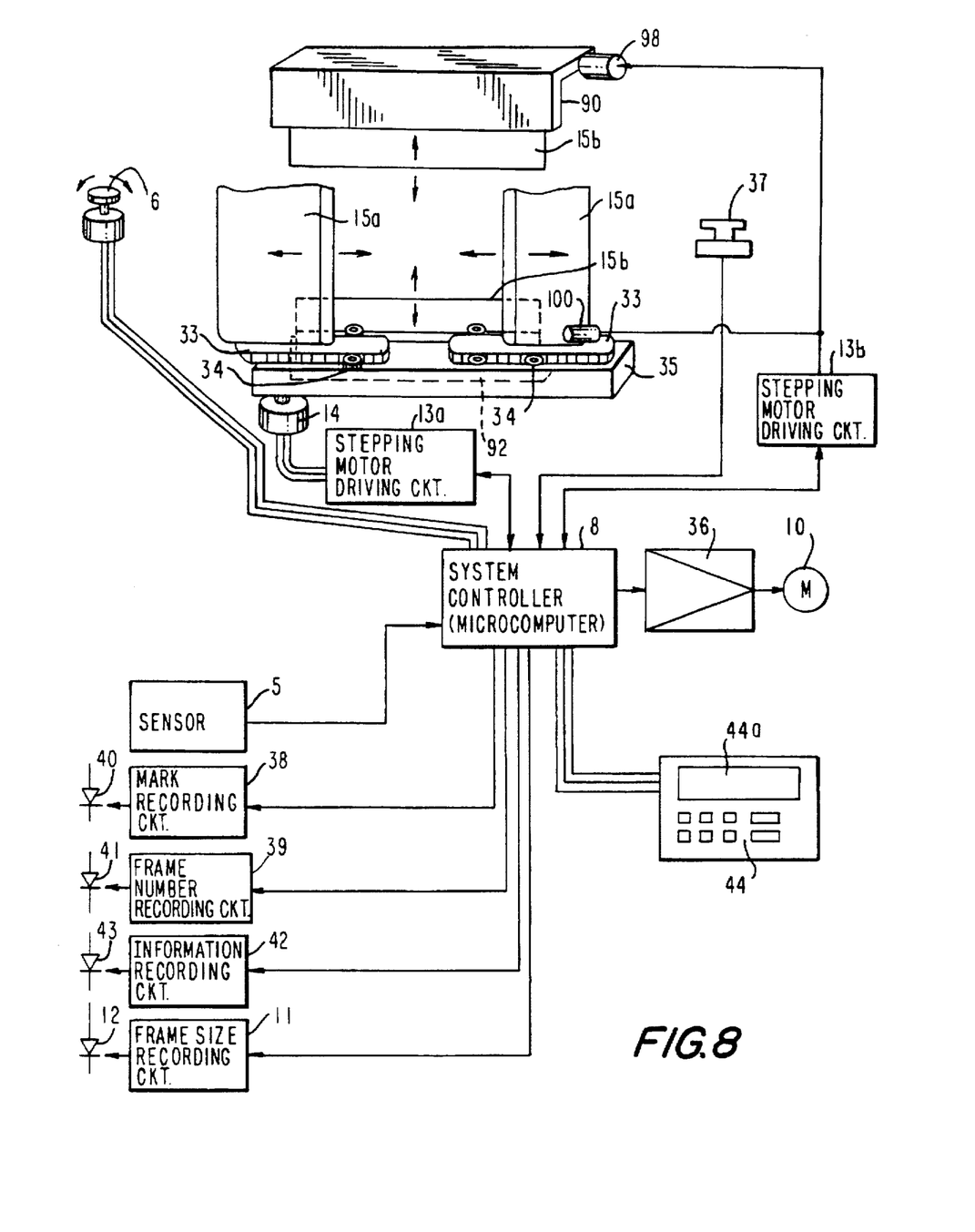
FIG. 8 is a block diagram of a control system for one embodiment of the photographic camera according to the present invention using the film of FIGS. 3A and 3B.

The film housing 18 has a guide roller 32 for automatically setting or loading the photographic film 1 and a film takeup spool 9 rotatable by a motor, shown at 10 in FIG. 8, for winding the exposed photographic film thereon.

The photographic camera has a light-emitting diode (LED) 5a positioned between the lower film guides 30, 31 for detecting the film position detecting holes 19, and a photodetector, shown in FIG. 6 at 5b, disposed on a pressure plate of the rear lid and positioned in registry with the LED 5a with the photographic film being arranged therebetween. The photodetector 5b has a diameter of 1.5 mm, for example.

The LED 5a emits infrared radiation having a wavelength of 940 nm, which is different from those radiation wavelengths to which the photographic film is sensitive. Referring to FIG. 8, the LED 5a and the photodetector 5b jointly make up a hole sensor 5 that applies an output signal to a counter in a system controller 8 that comprises a microcomputer. In this way, the system controller 8 can recognize the position of the photographic film over the exposure opening 7. The LED 5a and the photodetector 5b may be alternatively replaced with a photocoupler that also comprises an LED and a photodetector but which are positioned in confronting relationship, as described hereinbelow.

Figure 4A:
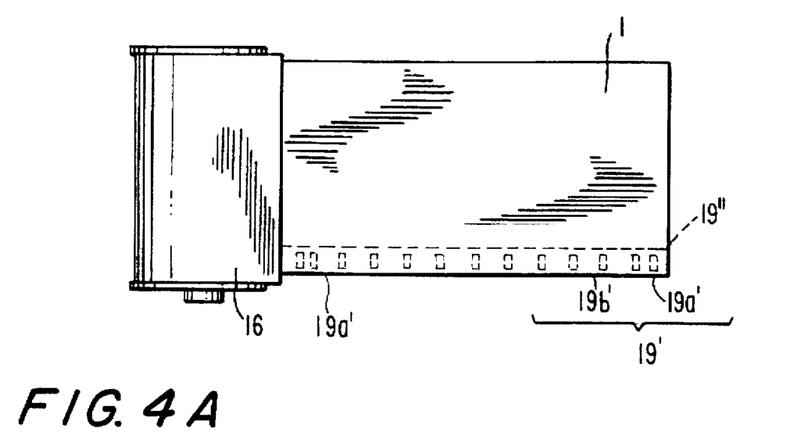
FIGS. 4A and 4B are elevational views of film cartridges that can be used in another embodiment of the photographic camera of the present invention.
Figure 4B:
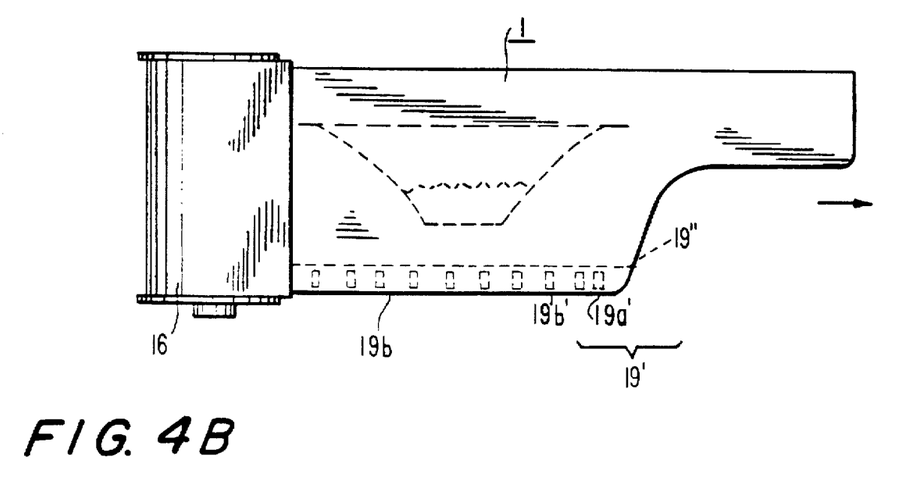
Figure 9:
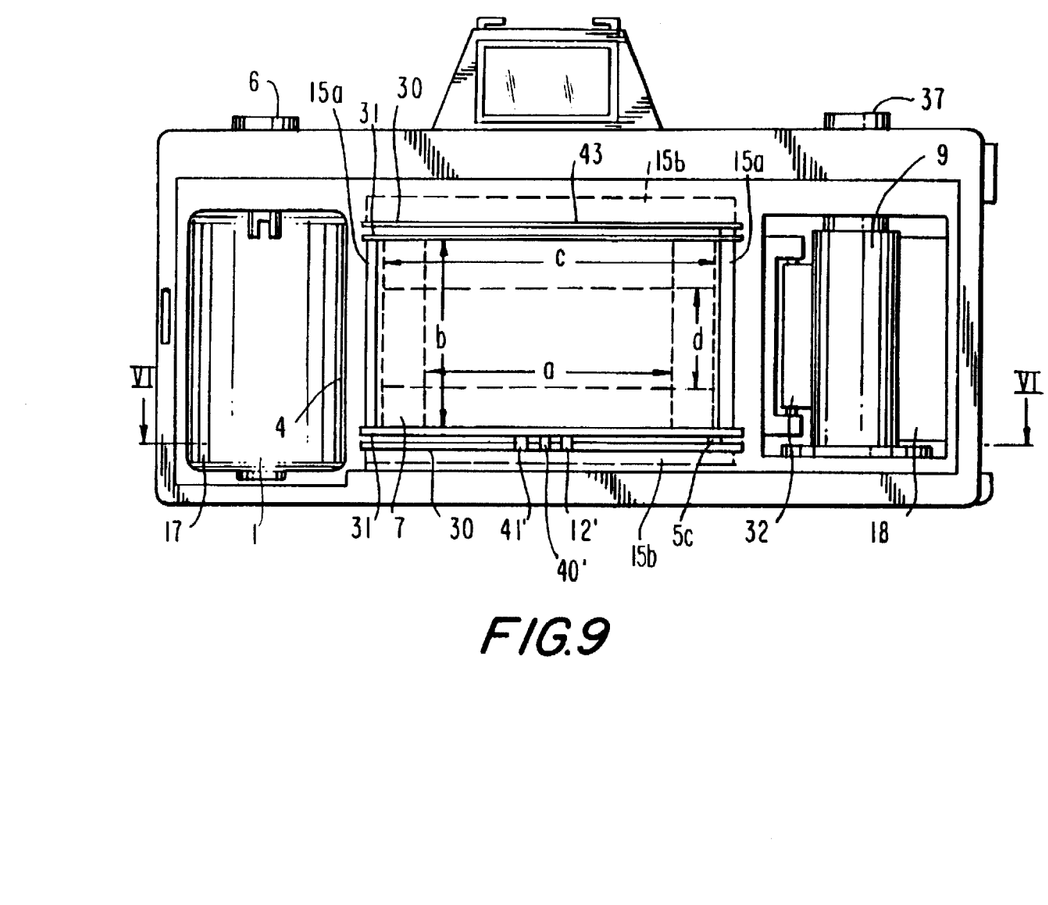
FIG. 9 is a rear elevational view of the photographic camera of another embodiment of the present invention with the rear lid removed.

Alternatively, as shown in FIG. 9 the LED 5a can be replaced by a magnetic head 5c that operates to sense the magnetic marks 19′, shown in FIGS. 4A and 4B, that are on the marginal edge area 19″ of the unexposed film.

In FIG. 5, the exposure area opening 7 has its size defined by left and right movable masks 15a that are laterally movable over the length of the exposure opening 7 from opposite sides thereof, and by upper and lower movable masks 15b that are vertically movable over the width of the exposure opening from opposite edges thereof. The size of the exposure opening 7 in the longitudinal and width directions of the photographic film can selectively be changed to three different rectangular dimensions such as b×a (30×40) mm, b×c (30×53.3) mm, and d×c (16.7×53.3) mm, as indicated by the three pairs of broken lines in FIG. 5.

Figure 7:
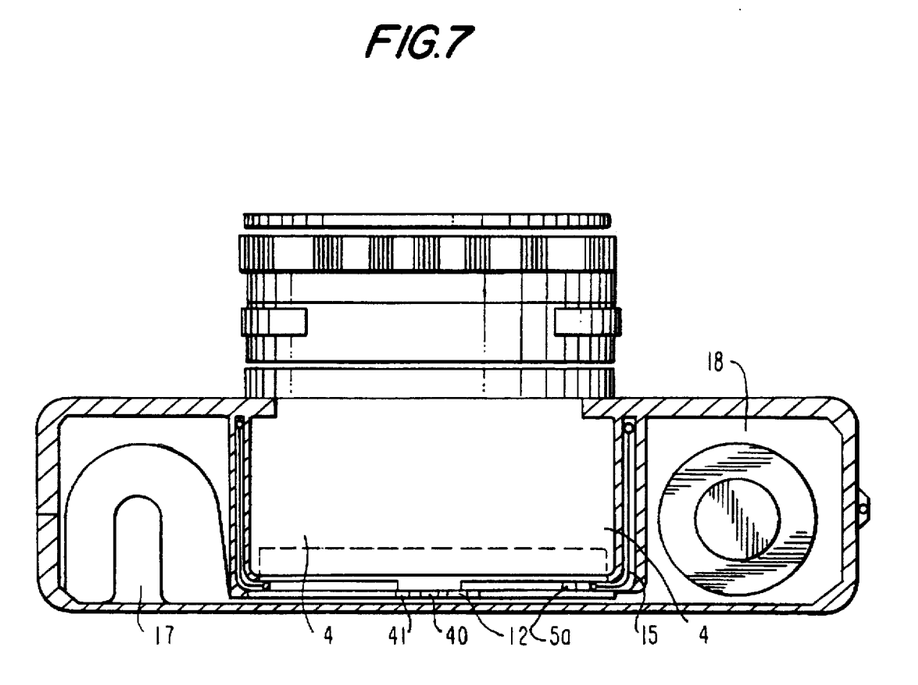
FIG. 7 is a cross-sectional view taken along line VII—VII of FIG. 5.
Figure 10:
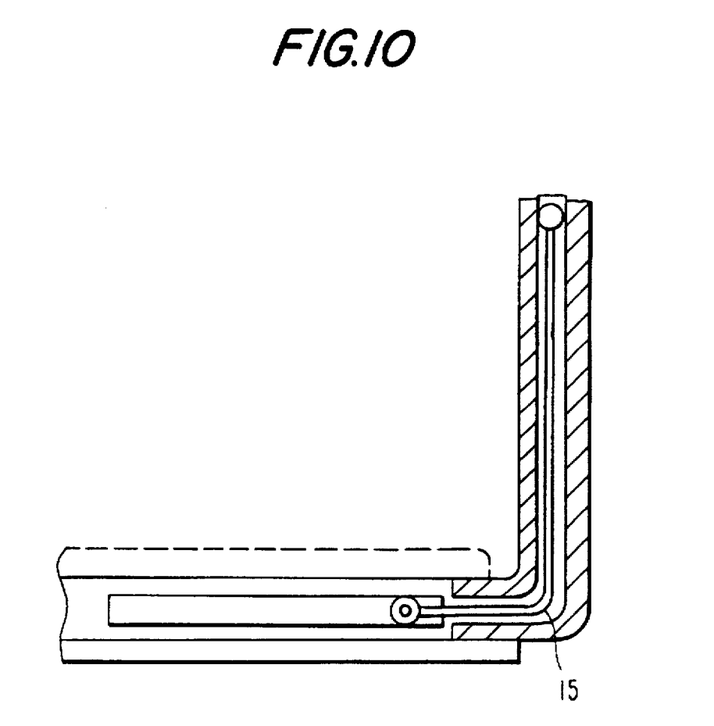
FIG. 10 is an enlarged fragmentary view of a portion of the camera shown in FIG. 7.

As shown in FIGS. 7, 8, and 10, the left and right movable masks 15a are retractable into left and right side walls, respectively, that are positioned on opposite sides of the exposure opening 7 and extend substantially perpendicularly to the photographic film 1 as it extends over the exposure opening 7. As shown in FIG. 8, two linear toothed bars 33 are attached to the respective lower edges of the two movable masks 15a and are held in mesh with respective drive feed gears 34 of a gearbox 35, much like a rack and pinion assembly. When the gears 34 of the gearbox 35 are driven to rotate, the linear toothed bars 33, and hence the movable masks 15a, are linearly moved over the exposure opening 7. Also, as shown in FIGS. 8 and 11, the upper and lower movable masks 15b are retractable into upper and lower side walls 90 and 92, respectively, that are positioned on opposite edges of the exposure opening 7 and extend substantially parallel with the photographic film.

Figure 11:
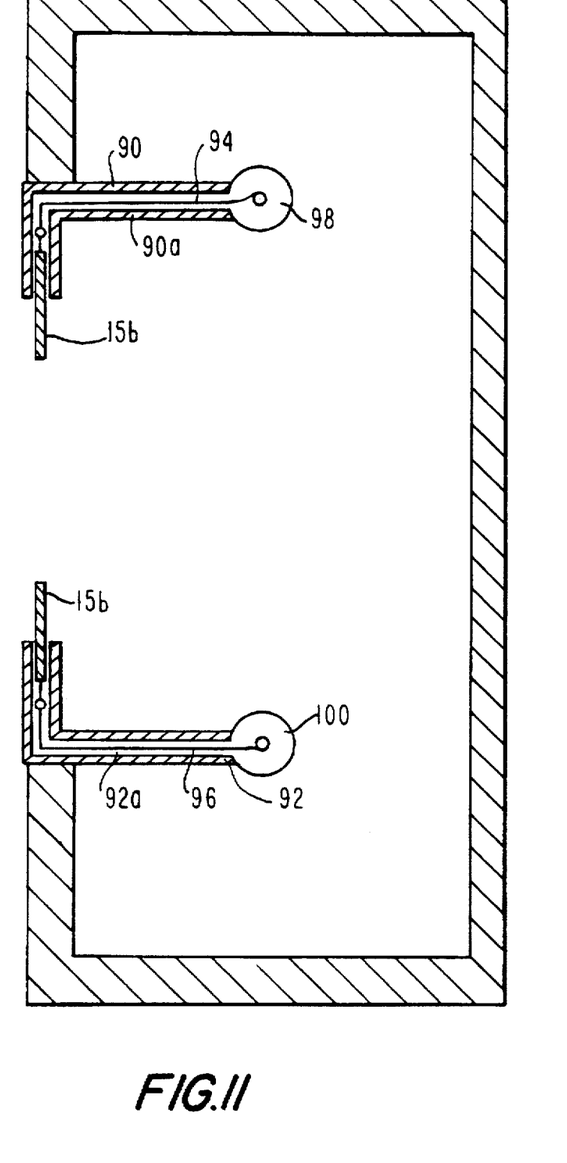
FIG. 11 is a partial cross-sectional view taken along line XI—XI of FIGS. 5.

As shown in FIG. 11, which is a partial cross-sectional view along section lines X1—X1 in FIG. 5, the walls 90 and 92 have an inner path 90a and 92a, respectively, that can guide masks 15b and wires 94 and 96, which are mechanically connected with rotary shafts of motors 98 and 100, respectively. When the motors 90 and 100 are driven, the movable masks 15b are linearly moved over the exposure opening 7.

As shown in FIGS. 5 and 8, the photographic camera has a frame size setting switch 6 which can manually be turned by the user of the camera to produce a command signal indicative of a selected frame size which is one of the frame sizes described previously. When the user selects a frame size with the frame size setting switch 6, the frame size setting switch 6 applies a command signal to the system controller 8, which then supplies first and second control signals to achieve the desired frame size through stepping motor driving circuits 13a and 13b to stepping motors 14, 98, and 100. The stepping motor 14 is energized to rotate the feed gears 34 to move the movable masks 15a, and stepping motors 98 and 100 are energized to rotate so as to move the masks 15b up and down through wires 94 and 96, respectively. At the same time that the movable masks 15a and 15b move, the hole sensor 5 produces and supplies a detected film position signal to the system controller 8, which processes the supplied film position signal to generate a control signal. The system controller 8 then supplies the control signal through an amplifier 36 to a motor 10, which rotates the film spool 9 to take-up the photographic film over a predetermined length.

At this time, the length over which the photographic film is driven corresponds to the distance that is determined by the frame size setting switch 6. That is, when the frame size setting switch 6 is actuated and selects the HDTV-matched frame size, the motor 10 is driven to feed the film in the longitudinal direction thereof, so that the sensor 5 generates a position control signal in response to holes 19. More specifically, when the first hole 19a meets with LED 5a, sensor 5 generates an output having a large level. Since the setting switch 6 has selected HDTV-matched frame size, the system controller 8 generates the control signal to stop the photographic film 1 at the position where the LED 5a meets with the hole 19a. Under this condition, the system controller 8 provides the control signals to supply to motors 14, 98, and 100, and the masks 15a and 15b are moved to predetermined positions in such a manner that the effective exposure area of the photographic film is defined to be 30 mm×53.3 mm corresponding to dimensions b×c in FIG. 1, for example.

To change frame size, the system controller 8 controls the motors 10, 14, 98 and 100 such that when the frame size setting switch 6 selects the panoramic frame size corresponding to dimensions d×c in FIG. 1, for example, the motor 10 is driven to feed the film until sensor 5 generates a large level output by detecting the next so-called first hole 19a. When the large level output produced in response to the first hole 19a is supplied to the system controller 8, this generates a signal so as to stop the motor 10. At this time, the system controller 8 generates a mask control signal in order to shift the masks 15b in the up and down directions through stepping motor drive circuit 13b until the distance between the edges of the masks is 16.7 mm, so that the effective exposure area of the photographic film is defined to be 30 mm×16.7 mm. Further, when the frame size setting switch 6 selects the NTSC frame size corresponding to dimensions b×a in FIG. 1, for example, the motor 10 is driven to feed the film until the sensor 5 generates a large level output by detecting the next first hole 19a. Since the switch 6 has selected the NTSC frame size, the system controller 8 supplies control signals to the motors 14, 98, and 100 through the circuits 13a and 13b. That is, the masks 15a are driven by motor 14 until the distance between opposite edges of the masks 15a becomes 40 mm, and also the masks 15b are moved until the distance between opposite ends of the masks 15b becomes 30 mm by operation of the motors 98 and 100. Therefore, an effective exposure area of the opening 7 is defined to be 30 mm×40 mm for the NTSC frame size. This invention can be applied to 70 mm film, or 30 mm film, or 16 mm film, or the like, as well as 35 mm film.

As shown in FIGS. 5 and 8, the photographic camera has a shutter release button 37. When the shutter release button 37 is depressed, the system controller 8 supplies a control signal to a mark recording circuit 38 for recording a central mark, a so-called effective exposure area position signal, indicative of the center of the frame 3 and also supplies a control signal to a frame number recording circuit 39 for recording a frame number. The mark recording circuit 38 energizes an LED 40 positioned at the lower film-guide pair 30, 31 for recording a central mark 40a, shown in FIG. 2, representing the center of the exposed frame 3a, 3b, or 3c. The frame number recording circuit 39 energizes an LED 41 positioned at the lower film guide pair 30, 31 for recording a frame number 41a, shown in FIG. 2, representing the number of the exposed frame 3. The frame number 41a can be recorded such that it agrees with an actual frame number.

Figure 12:
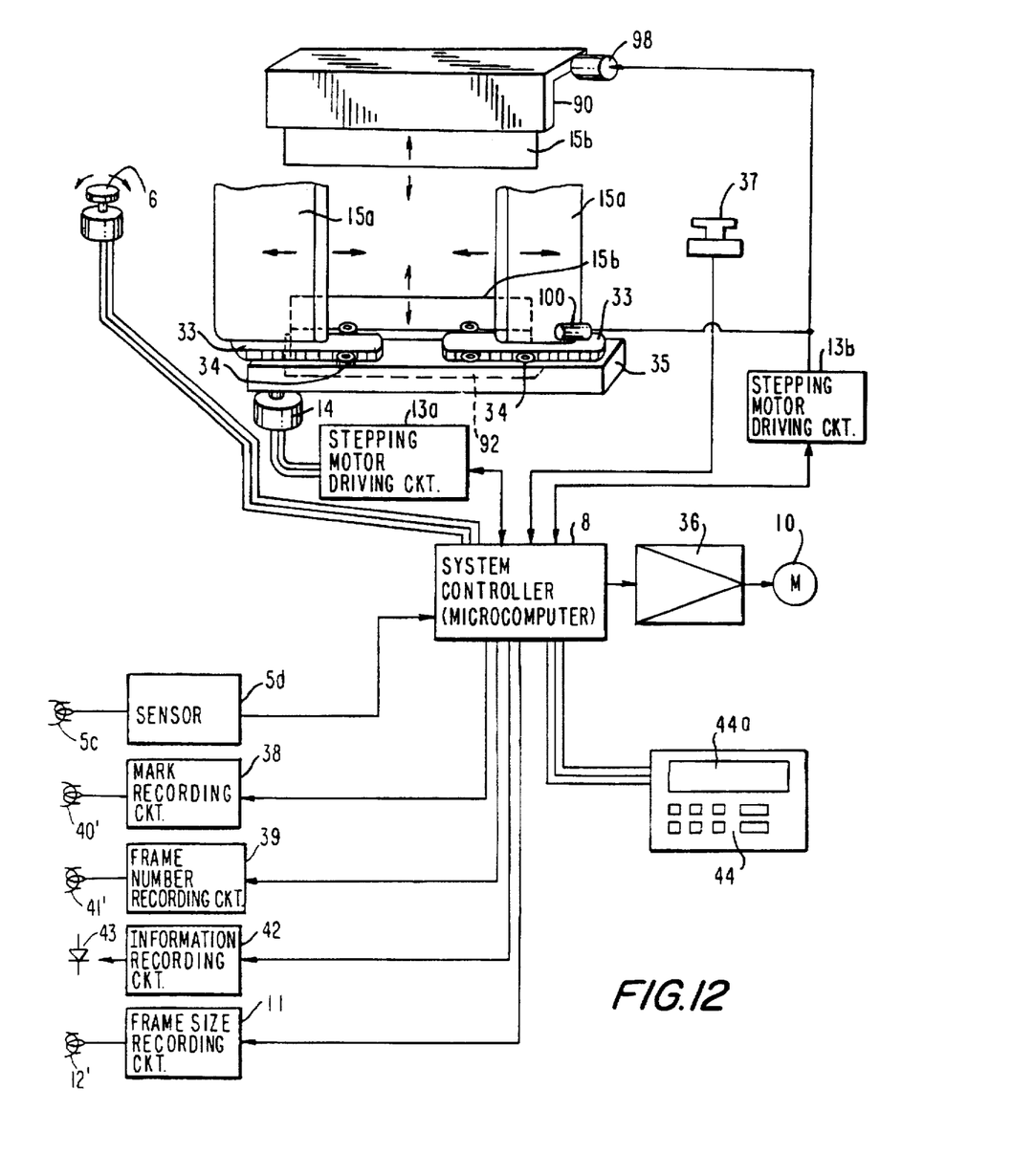
FIG. 12 is a block diagram of a control system for the other embodiment of the photographic camera according to the present invention using the film of FIGS. 4A and 4B.

Alternatively, as shown in FIG. 12, in place of LED 40 a magnetic head 40' can be employed to record the center mark on the marginal area 19" on the unexposed film. Similarly, the frame number can be recorded using another magnetic head 41'.

The system controller 8 also supplies a control signal to a frame size recording circuit 11 in response to actuation of the frame size setting switch 6 for recording a frame size signal, a so-called effective exposure area width signal, indicative of the frame size of the exposed frame 3. The frame size recording circuit 11 energizes an LED 12 positioned at the lower film guide pair 30, 31 for recording a frame size signal 12a, shown in FIG. 2.

Alternatively, as shown in FIG. 12, in place of LED 12 a magnetic head 12' can be employed to record the frame size signal on the marginal area 19" on the unexposed film, as shown in FIGS. 4A and 4B, for example.

The magnetic head 5c that senses the magnetic marks 19' on the film shown in FIGS. 4A and 4B is connected to the system controller 8 through a buffer amplifier 5d or a similar playback amplifier.

The LED 12 may be composed of four LED elements which are selectively energized to record respective ones of the frame size signals 12a, which represent the frame size set by the frame size setting switch 6. The various frame size signals 12a are shown by way of example in Table 1 below.

TABLE 1

| Frame Size | Frame size signal 12a |
| --- | --- |
| HDTV-matched full-frame size | III |
| Panoramic frame size | II |
| NTSC-matched full-frame size | I |

The central mark 40a and the frame size signal 12a supply information regarding the frame position and the frame size to an automatic printer for controlling the automatic printer when the exposed and processed film is printed.

While frame sizes can be recognized by measuring the distances between adjacent central marks 40a when the exposed film is printed, the processing speed of the automatic printer can be increased by using the frame size signal 12a.

At the same time that the photographic film 1 is exposed, the system controller 8 supplies an information signal to an information recording circuit 42 for recording desired information. The information recording circuit 42 energizes an LED 43 positioned at the upper film guide pair 30, 31 for recording such information 43a on the lower marginal edge, shown in FIG. 2, of the photographic film 1. The information 43a may be information that is supplied from the camera lens and the camera itself upon exposure or could consist of the exposure date, the person who took the picture, an exposure condition, or other information that the user has entered through an input device 44, such as a keypad, on the outer surface of the rear lid of the camera body 10. The amount of information 43a, that is, the number of characters that can be recorded, is dependent upon the frame size, and is displayed on a display panel 44a of the input device 44. The LED 43 has a number of LED elements that are selectively energized depending on the frame size.

An analysis has been made to determine the optimum position where the information 43a should be recorded and the optimum position where the holes 19 or magnetic marks 19' are defined from the standpoints of the user's convenience and a psychological effect that those positions have on the user. The results of the analysis are as follows:

(1) If marginal edges outside of the effective exposure area of the film are available as a band for recording user's information, then the information should more preferably be positioned on the lower marginal edge of the print paper, rather than on the upper marginal edge.

(2) Study of the developing and printing processes in processing laboratories indicates that in many cases information about the film itself is printed in many cases on film negatives, such that the film information will be positioned on the upper marginal edge of the print paper. It is preferable not to mix the film information and the band for recording user's information.

From the above results, it is preferable to position the film position detecting holes 19 upwardly of the effective exposure area of the film when it is exposed.

As described above, the photographic camera according to the present invention has a detecting means 5a, 5b for detecting the feeding of the photographic film 1, a film control system 8 for controlling the distance by which the photographic film 1 moves and for controlling the photographic film 1 for a predetermined length and width corresponding to the selected exposure opening 7 and for controlling signal recording devices 8, 11, 12, 38, 40 disposed near the exposure opening 7 for recording control signals indicative of the position and size of the exposure opening 7 on the photographic film 1 when the photographic film 1 is exposed through the exposure opening 7.

After the photographic film 1 is exposed using the photographic camera, the processed photographic film 1 bears control signals that are recorded in a signal recording area 21, shown in see FIGS. 1 and 2, thereof and that will be used when the photographic film 1 is printed. Therefore, even if the developed photographic film 1 contains frees of different frame sizes, it can be automatically printed by an automatic printer without requiring individual adjustment.

The photographic camera according to the present invention also has a film control system 8, 9, 10 for controlling the feeding or driving of the photographic film 1, and an opening control system 13a, 13b, 14, 15a, 15b, 98, and 100 for varying the length and width of the exposure opening 7 along the photographic film 1.

As shown in FIG. 1, the photographic film 1 used in the photographic camera according to the present invention has a signal recording area 21 located between an effective exposure area 20 and a marginal edge thereof for magnetically or optically recording control signals that will be used when the photographic film 1 is processed and printed. The film 1 has holes 19 or magnetic marks 19' defined in an upper marginal edge area thereof between the effective exposure area 20 and the marginal edge for detecting the distance by which the photographic film 1 has been moved.

In the photographic camera shown and described above, a plurality of holes or magnetic marks are formed on the photographic film for each single frame, however, only one hole or one magnetic mark can be utilized for each one frame.

The present invention uses an exposure control signal magnetically or optically recorded between an edge of the photographic film and an effective exposure area of the photographic film. This signal can be used not only by the processor but also by the user, and the user can print by a simple printer system according to the present invention. This simple home system can be combined with a computer system or a television for display. Also, an exposure control signal of the present invention may include an auxiliary signal for controlling a printer system or indicating certain features to the user. Thus, the present invention as described above can be used for many applications because it avoids using the punched in notch required in previously proposed systems.

Having described preferred embodiments of the invention with reference to the accompanying drawings, it is to be understood that the invention is not limited to those precise embodiments and various changes and modifications could be effected by one skilled in the art without departing from the spirit or scope of the present invention, as defined in the appended claims.

What is claimed is:

1. A photographic camera comprising:
   a camera body,
   a first housing disposed in said camera body for housing unexposed photographic film in a photographic film cartridge,
   a second housing disposed in said camera body for housing the photographic film drawn from said photographic film cartridge,
   film drive means disposed in said camera body for driving the photographic film between said first and second housings,
   means for varying the length and width of an exposure opening in said camera body in a film-feed direction and a film width direction, whereby a size of an effective area of the photographic film drawn from said photographic film cartridge available to an image of a subject to be recorded on the photographic film is changed,
   exposure area control means disposed in said camera body for changeably controlling said means for varying, and
   recording means disposed in said camera body for recording at least a signal that indicates the size of the effective exposure area on the photographic film controlled by said means for varying.

2. A photographic camera according to claim 1, wherein said photographic film has a marginal area between an edge of the photographic film and said effective exposure area of the photographic film, and wherein said signal is recorded on said marginal area of said photographic film.

3. A photographic camera according to claim 1, wherein said recording means includes generating means for generating an exposure area position signal and an exposure area size signal, and wherein said processed photographic film drive control means comprises means for controlling driving of the photographic film in response to detecting said exposure area position signal.

4. A photographic camera according to claim 1, wherein said means for varying comprises movable mask means mounted on said camera body.

5. A photographic camera according to claim 4, wherein said movable mask means consists of first and second pairs of movable masks, said first pair of movable masks being mounted on said camera body for respective movement in a direction of feeding of the film and opposite to said direction, and said second pair of masks being mounted on said camera body for respective movement in a perpendicular direction of feeding of the photographic film.

6. A photographic camera according to claim 4, wherein said exposure area control means includes a frame signal setting switch for selecting at least two exposure area sizes, and wherein said movable mask means is driven to at least two predetermined positions in response to operation of said frame signal setting switch.

7. A photographic camera including a camera body and comprising:
   a first housing for housing a photographic film cartridge containing a photographic film strip;
   a second housing for housing a photographic film strip drawn from said cartridge;
   film feed means for feeding the photographic film between said first and second housings;
   means for varying the length and width of an exposure opening in said camera body in a film-feed direction and film width direction, whereby a size of an effective exposure area on the photographic film fed by said film feed means available to record an image of a subject is changed;
   exposure area control means for changeably controlling said means for varying; and
   recording means for recording a signal on the photographic film that indicates the size relating to the effective exposure area where the photographic film is to be exposed by said means for varying.

8. A photographic camera according to claim 7, wherein said recording means includes means for producing said signal indicating the size relating to the effective exposure area.

9. A photographic camera according to claim 7, wherein said recording means includes means for producing said signal indicating the size relating to the effective exposure area, wherein said photographic film has a marginal area between an edge of the photographic film and said effective exposure area of the photographic film, and wherein said signal produced by said recording means is recorded on said marginal area of said photographic film.

10. A photographic camera according to claim 7, wherein said recording means includes means for producing an exposure area position signal, wherein said photographic film has a marginal area between an edge of the photographic film and said effective exposure area of the photographic film, with said exposure area position signal generated by said recording means being recorded on said marginal area of the photographic film.

11. A photographic camera according to claim 7, wherein said recording means including means for producing an exposure area number indicating signal.

12. A photographic camera according to claim 7, wherein said recording means includes means for producing an exposure area number indicating signal, wherein said photographic film has a marginal area between an edge of the photographic film and said effective exposure area of the photographic film, with said exposure area number indicating signal generated by said recording means being recorded on said marginal area of the photographic film.

13. A photographic camera according to claim 7, wherein said means for varying comprises movable mask means, mounted on said camera body.

14. A photographic camera according to claim 13, wherein said movable mask means consists of first and second pair of movable mask, said first pair of movable masks being mounted on said camera body for respective movement in a direction of feeding of the film and opposite to said direction, and said second pair of movable masks being mounted on said camera body for respective movement in a perpendicular direction of feeding of the photographic film.

15. A photographic camera according to claim 7, wherein said exposure area control means includes a frame signal setting switch for selecting at least two exposure area sizes, and wherein said means for varying comprises two movable mask means, said movable mask means being driven to at least two predetermined positions in response to operation of said frame signal setting switch.

16. A photographic camera according to claim 6, wherein said at least two predetermined positions correspond to HDTV format size and NTSC format size, respectively.

17. A photographic camera comprising:

a first housing for housing a photographic film cartridge containing a photographic film;

a second housing for housing the photographic film drawn from said cartridge;

film feed means for feeding the photographic film between said first and second housings;

film feed control means for controlling feeding of the photographic film based upon detection of at least one hole formed in said photographic film;

exposure means for changeably controlling the length and width of an exposure area on the photographic film fed by said film feed means available to record an image of a subject; and recording means for recording a signal on said marginal area of the photographic film that indicates a size relating to the effective exposure area where the photographic film is to be exposed by said exposure means, said signal being positioned away from one of said holes.

18. A photographic camera comprising according to claim 17, wherein said signal is recorded between said holes on the photographic film.

19. A photographic camera comprising according to claim 18, said signal includes at least two kind of indications, one of which indicates HDTV format and the other of which indicates NTSC format.

* * * * *